(12) United States Patent
Oshiumi

(10) Patent No.: US 10,293,828 B2
(45) Date of Patent: May 21, 2019

(54) ENGINE STARTING SYSTEM

(71) Applicant: TOYOTA JIDOSHA KABUSHIKI KAISHA, Toyota-shi, Aichi-ken (JP)

(72) Inventor: Yasuhiro Oshiumi, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 60 days.

(21) Appl. No.: 15/300,442

(22) PCT Filed: Mar. 13, 2015

(86) PCT No.: PCT/JP2015/058394
§ 371 (c)(1),
(2) Date: Sep. 29, 2016

(87) PCT Pub. No.: WO2015/151849
PCT Pub. Date: Oct. 8, 2015

(65) Prior Publication Data
US 2017/0120924 A1 May 4, 2017

(30) Foreign Application Priority Data
Apr. 1, 2014 (JP) ................. 2014-075612

(51) Int. Cl.
*B60W 30/192* (2012.01)
*B60K 6/26* (2007.10)
*B60W 10/08* (2006.01)
*B60W 20/20* (2016.01)
*B60W 10/02* (2006.01)
*B60W 20/40* (2016.01)
(Continued)

(52) U.S. Cl.
CPC ............. *B60W 30/192* (2013.01); *B60K 6/26* (2013.01); *B60K 6/387* (2013.01); *B60K 6/445* (2013.01); *B60W 10/02* (2013.01); *B60W 10/06* (2013.01); *B60W 10/08* (2013.01); *B60W 20/10* (2013.01); *B60W 20/20* (2013.01); *B60W 20/40* (2013.01); *F02N 11/04* (2013.01); *B60K 2006/268* (2013.01); *B60W 30/20* (2013.01); *B60W 2510/0208* (2013.01);
(Continued)

(58) Field of Classification Search
None
See application file for complete search history.

(56) References Cited

U.S. PATENT DOCUMENTS

| 2007/0087894 | A1 | 4/2007 | Tsuneyoshi et al. |
| 2012/0270698 | A1* | 10/2012 | Hisada ............... B60K 6/387 477/5 |
| 2016/0082941 | A1* | 3/2016 | Oshiumi ............. B60K 6/387 180/65.265 |

FOREIGN PATENT DOCUMENTS

| CN | 105163992 A | 12/2015 |
| JP | 2005-184999 A | 7/2005 |
| JP | 2012-224244 A | 11/2012 |

* cited by examiner

*Primary Examiner* — Hussein Elchanti
*Assistant Examiner* — Kyung J Kim
(74) *Attorney, Agent, or Firm* — Hunton Andrews Kurth LLP

(57) ABSTRACT

An engine starting system for hybrid vehicle is provided. The engine starting system is applied to a hybrid vehicle in which a friction clutch is disposed between an engine and a power distribution device. In order to reduce gear noise and vibrations, a second motor establishes a cancel torque to cancel a reaction torque acting on an axle when starting the engine. The engine starting system is configured to increase the torque of the second motor in a direction of a drive torque rotating the axle, when starting the engine while bringing the friction clutch into engagement in a slipping manner.

5 Claims, 10 Drawing Sheets

(51) Int. Cl.
  *B60W 20/10* (2016.01)
  *B60K 6/387* (2007.10)
  *B60W 10/06* (2006.01)
  *B60K 6/445* (2007.10)
  *F02N 11/04* (2006.01)
  *B60W 30/20* (2006.01)
  *F02N 11/08* (2006.01)
  *F16H 3/72* (2006.01)
  *F16H 37/08* (2006.01)

(52) U.S. Cl.
  CPC .............. *B60W 2510/0275* (2013.01); *B60W 2510/083* (2013.01); *B60W 2710/022* (2013.01); *B60W 2710/083* (2013.01); *B60Y 2200/92* (2013.01); *B60Y 2300/182* (2013.01); *B60Y 2300/192* (2013.01); *B60Y 2300/205* (2013.01); *B60Y 2300/42* (2013.01); *B60Y 2300/60* (2013.01); *B60Y 2300/64* (2013.01); *B60Y 2400/424* (2013.01); *B60Y 2400/60* (2013.01); *B60Y 2400/80* (2013.01); *F02N 11/0822* (2013.01); *F02N 2200/061* (2013.01); *F02N 2200/101* (2013.01); *F02N 2300/104* (2013.01); *F16H 3/727* (2013.01); *F16H 2037/0866* (2013.01); *F16H 2200/2005* (2013.01); *F16H 2200/2007* (2013.01); *F16H 2200/2097* (2013.01); *Y02T 10/6239* (2013.01); *Y02T 10/6286* (2013.01); *Y10S 903/906* (2013.01); *Y10S 903/914* (2013.01); *Y10S 903/93* (2013.01)

[Fig. 1]
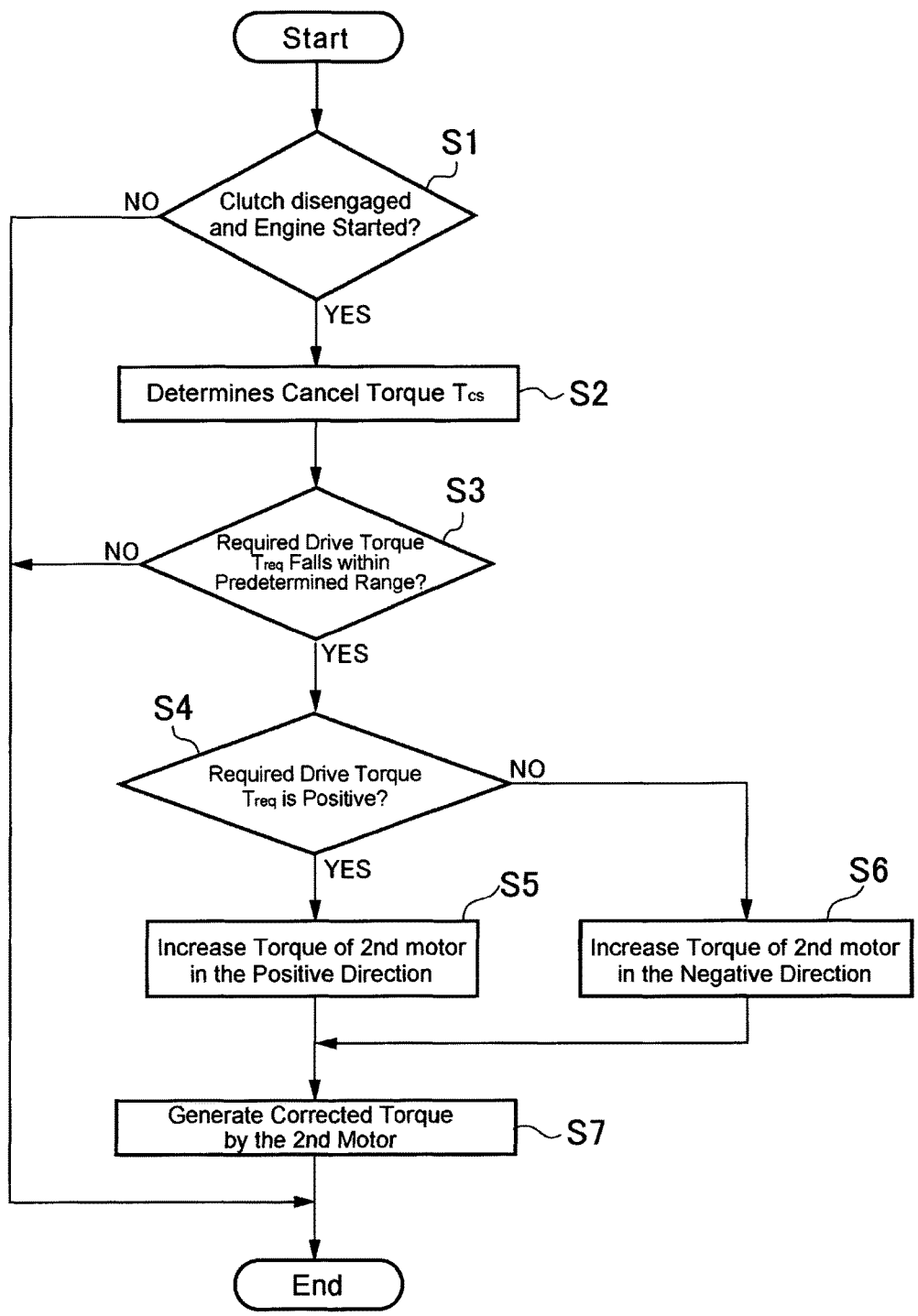

[Fig. 2]
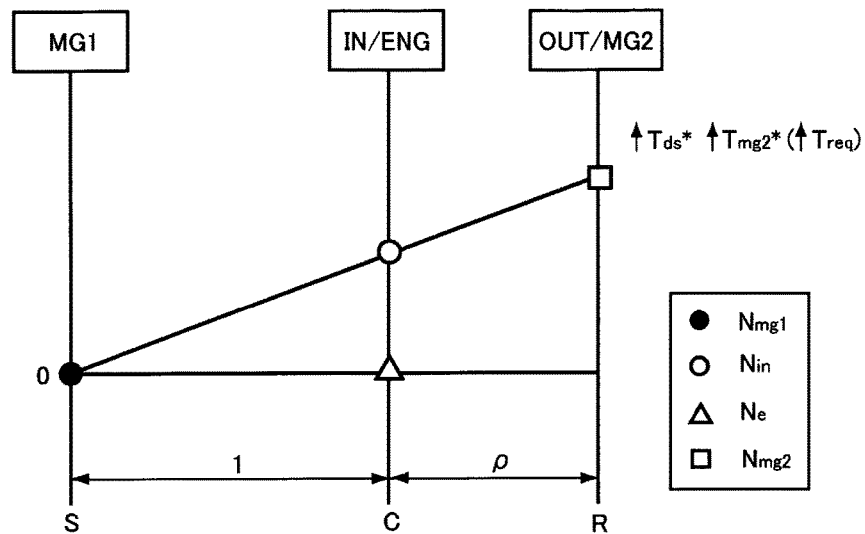
[Fig. 3]
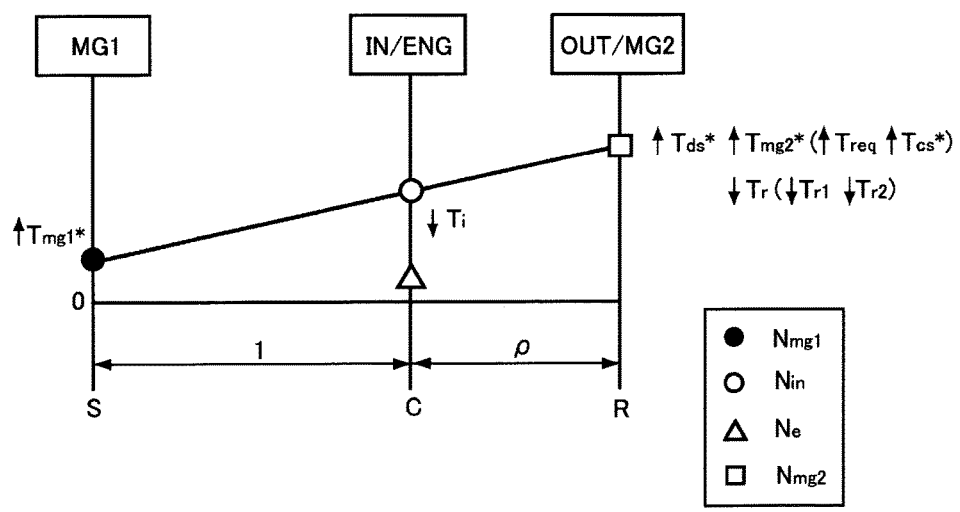

[Fig. 4]
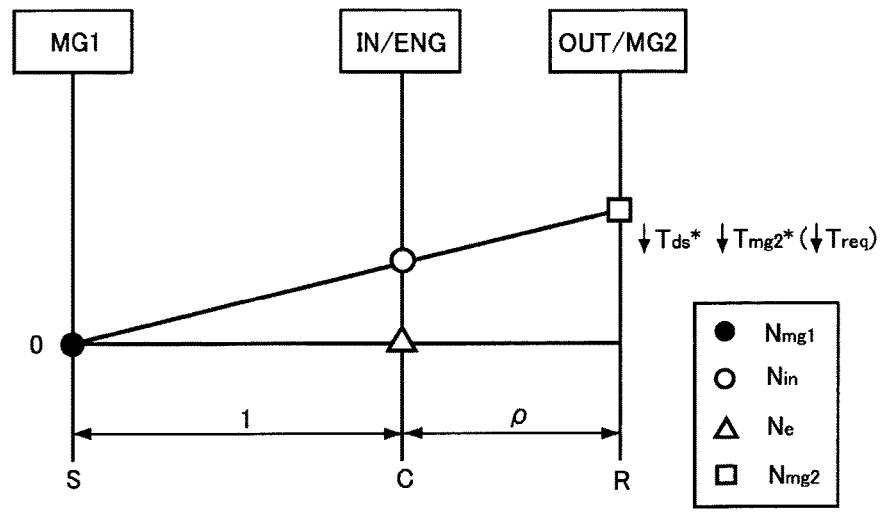
[Fig. 5]
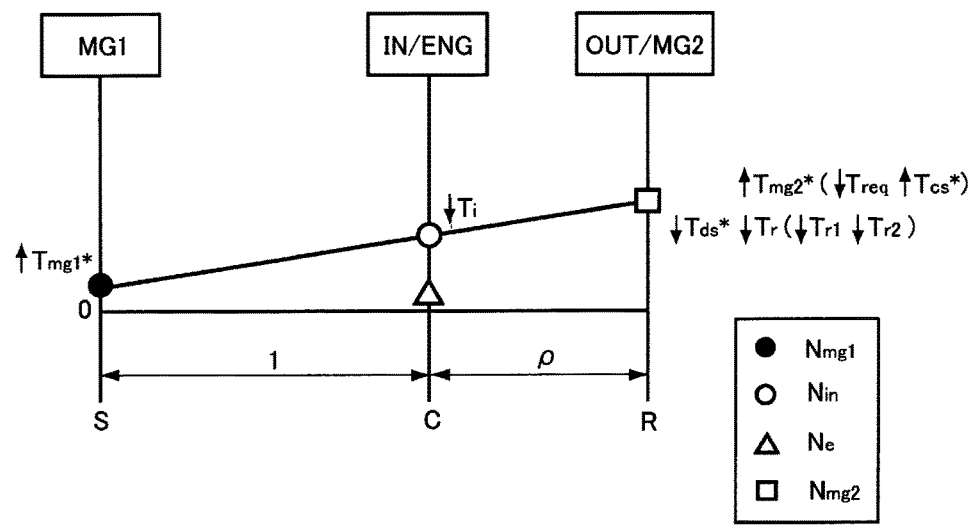

[Fig. 6]
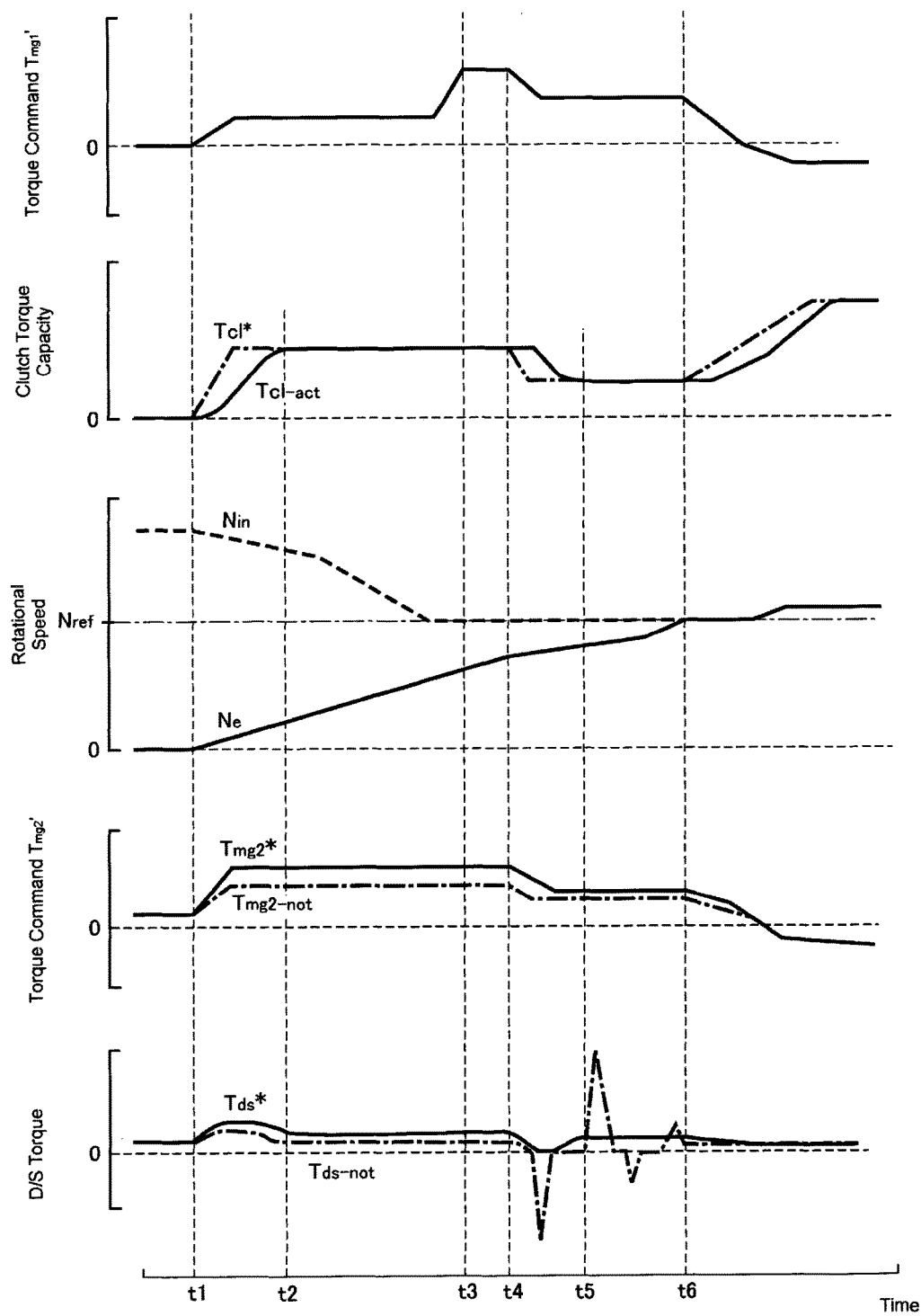

[Fig. 7]
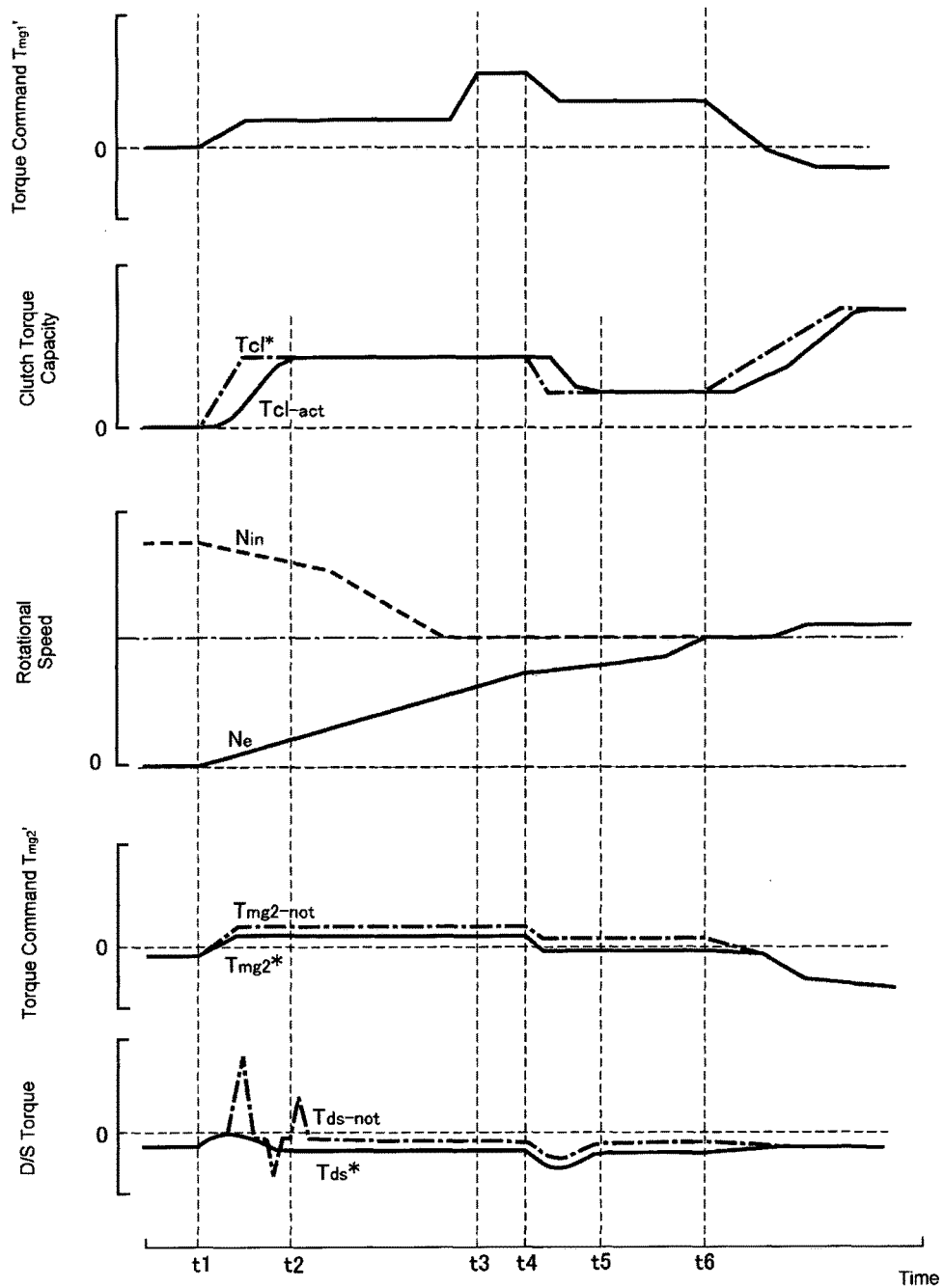

[Fig. 8]
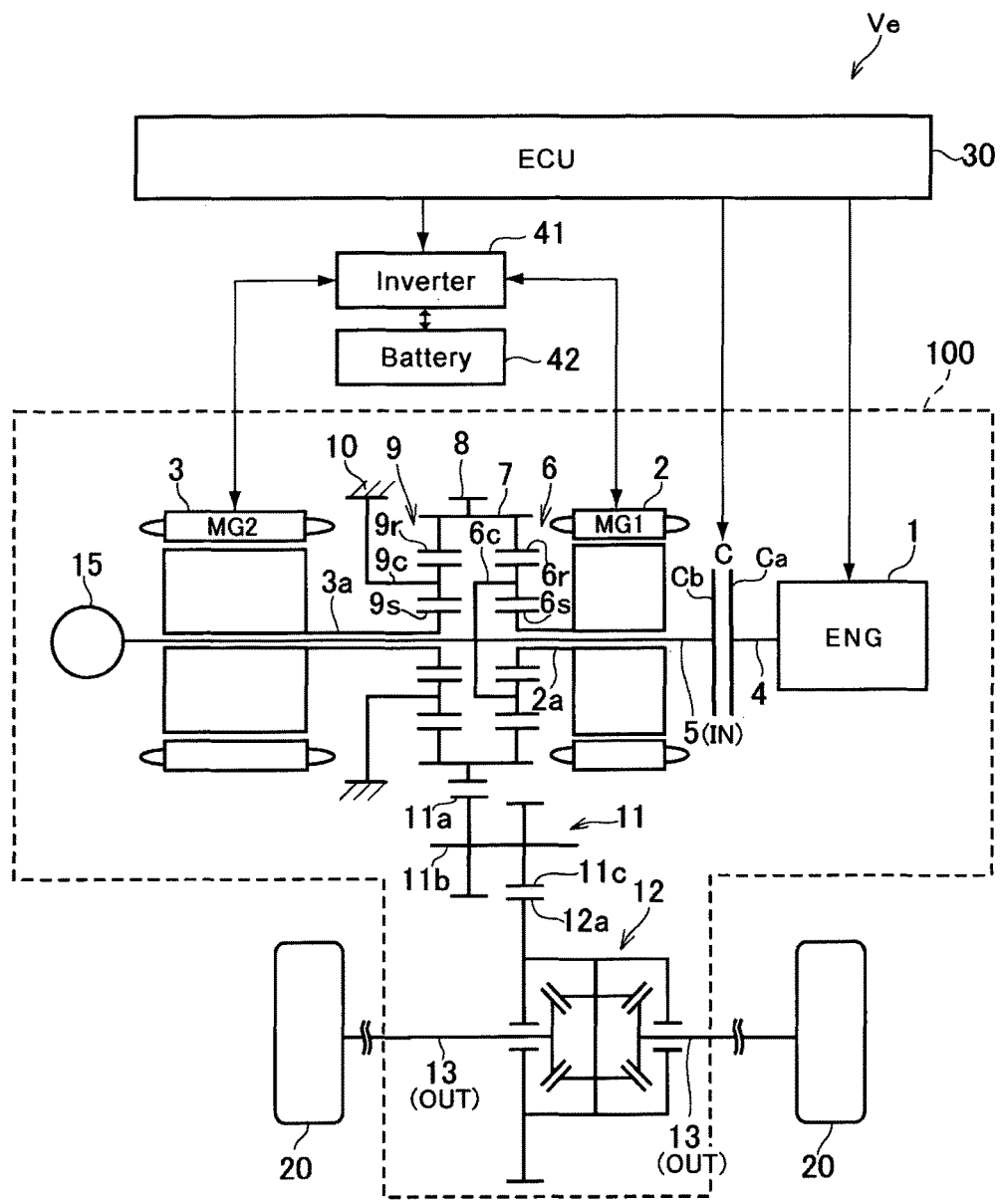

[Fig. 9]
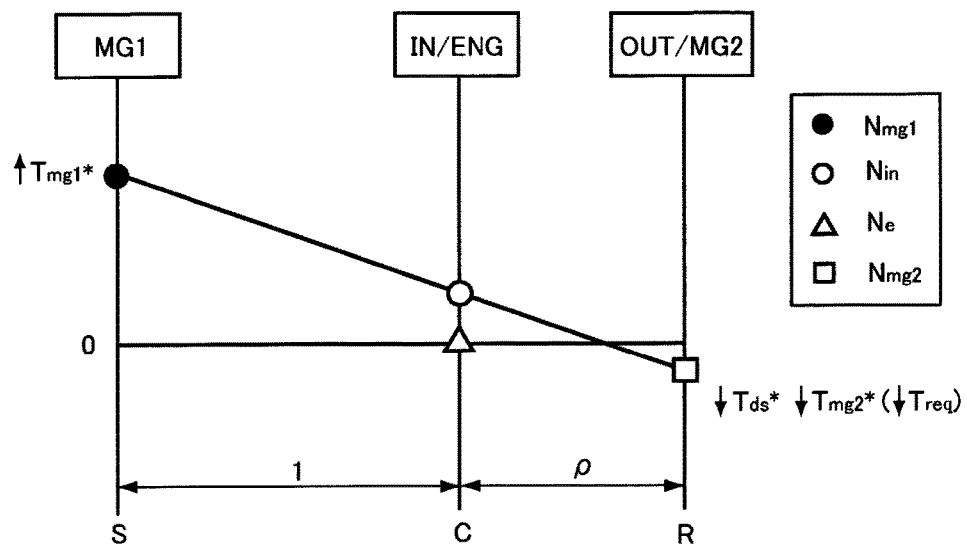
[Fig. 10]
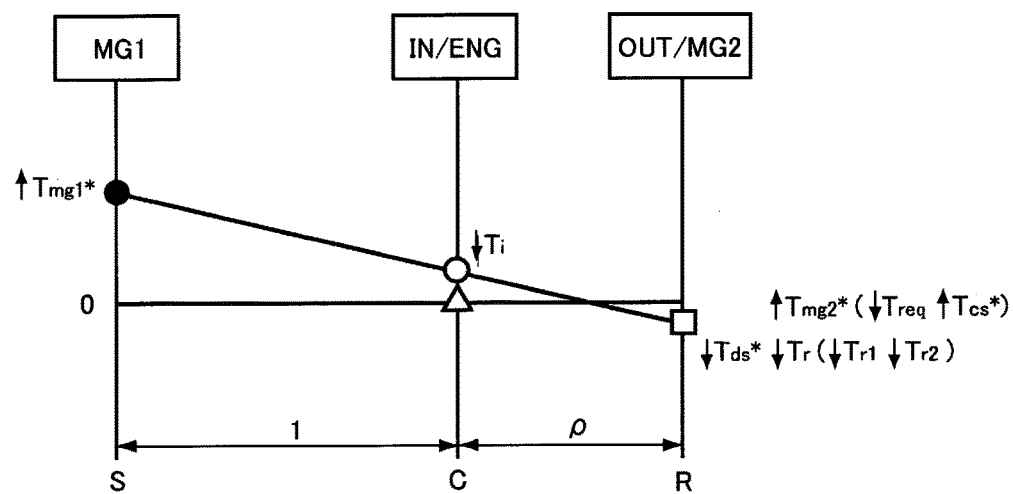

[Fig. 11]
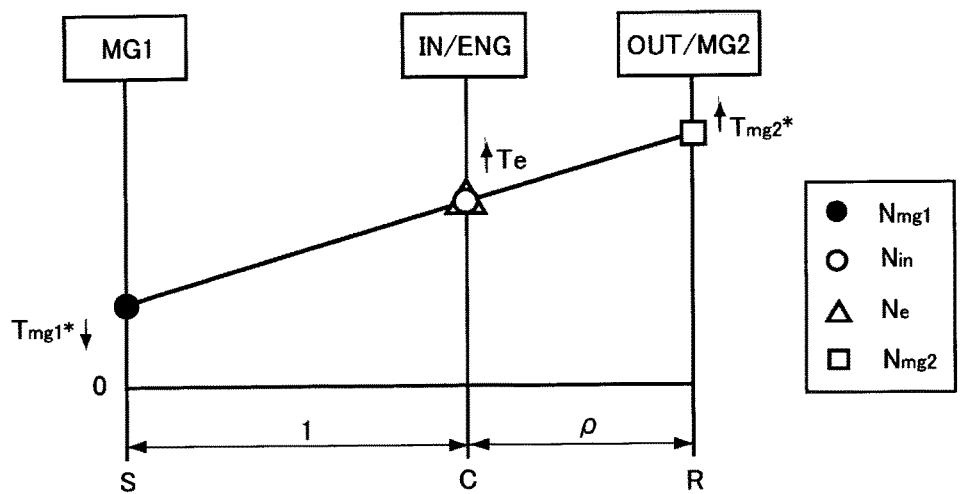
[Fig. 12]
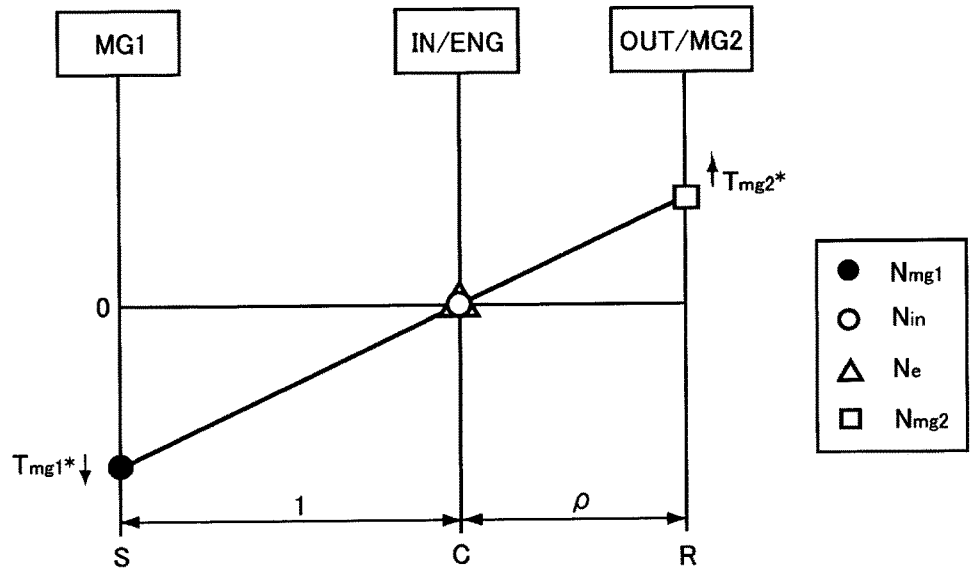

[Fig. 13]
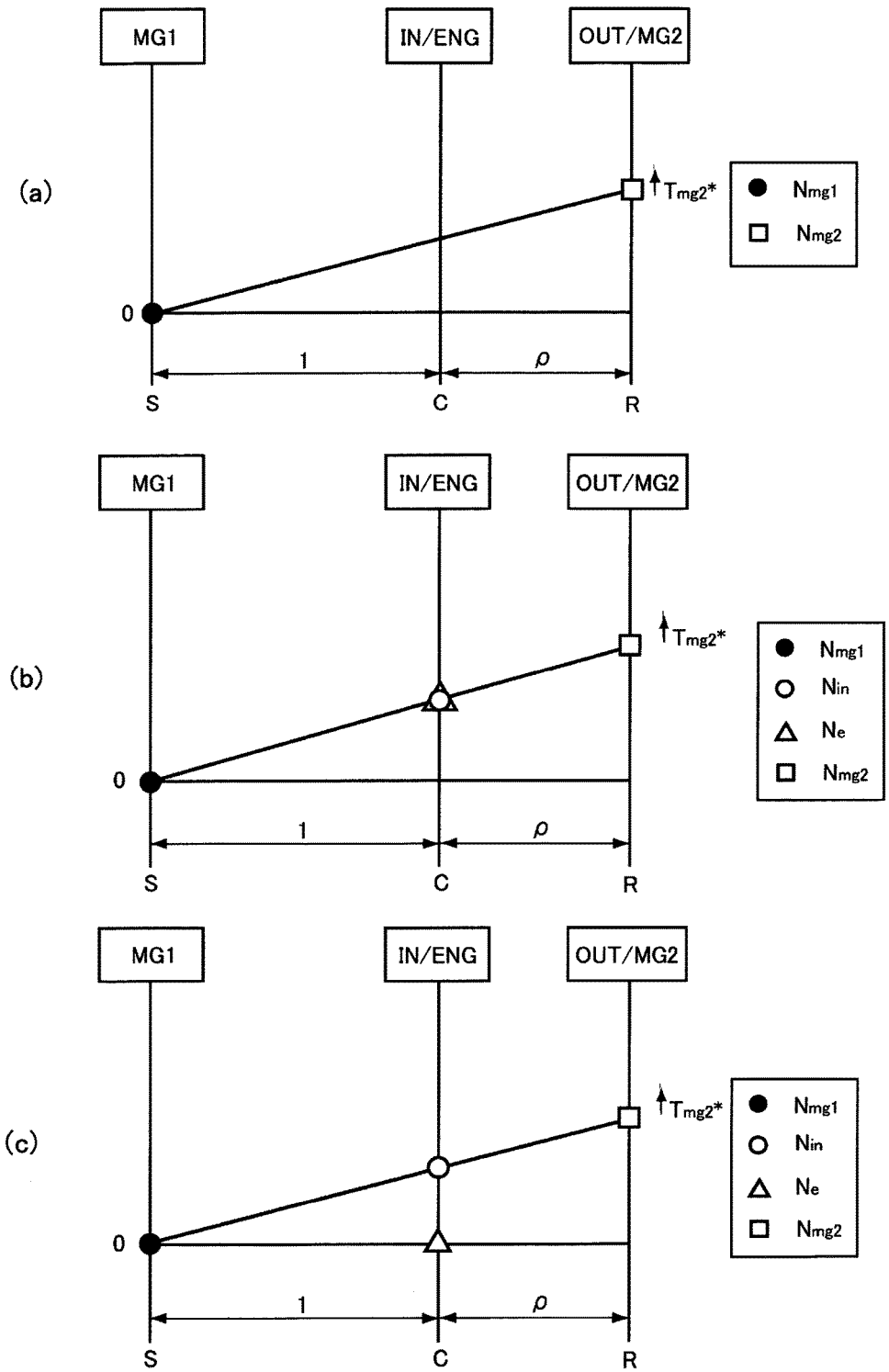

[Fig. 14]
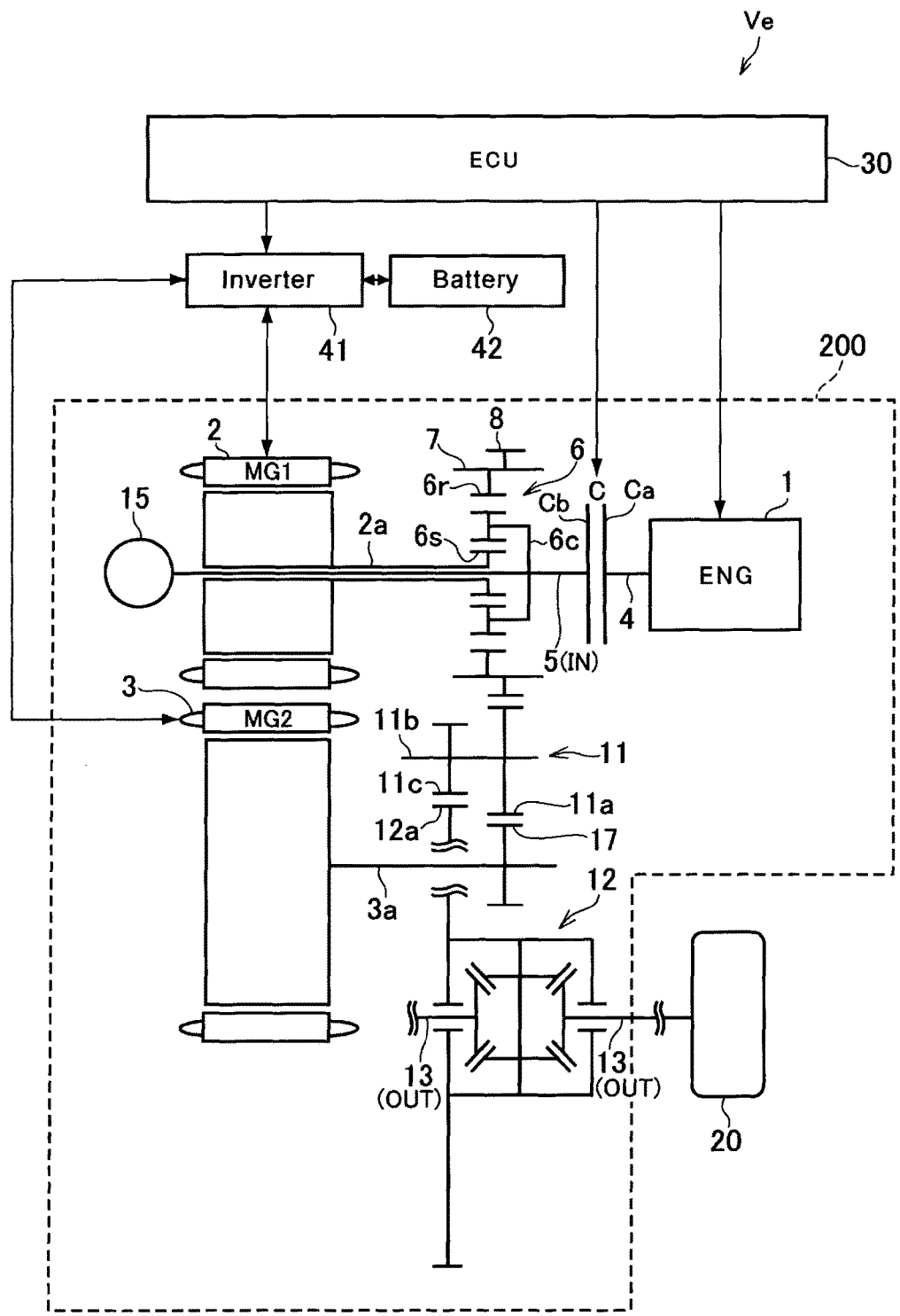

ENGINE STARTING SYSTEM

CROSS-REFERENCE TO RELATED APPLICATIONS

This is a national phase application based on the PCT International Patent Application No. PCT/JP2015/058394 filed Mar. 13, 2015, claiming priority to Japanese Patent Application No. 2014-075612 filed Apr. 1, 2014, the entire contents of both of which are incorporated herein by reference.

TECHNICAL FIELD

This invention relates to an engine starting system for a hybrid vehicle in which a power of an engine is distributed to a motor side and to a driving wheels side through a power distribution device, and in which the engine is connected to the power distribution device through a clutch.

BACKGROUND ART

For example, JP-A-2012-224244 describes a 2-motor split type hybrid vehicle in which a planetary gear unit having a sun gear, a carrier and a sun gear is employed as a power distribution device. In the hybrid vehicle taught by JP-A-2012-224244, the sun gear is coupled to a first motor/generator, the carrier is coupled to the engine through a clutch, and the ring gear serves as an output element to deliver torque to drive wheels. Torque of a second motor/generator is added to the torque delivered from the ring gear to the drive wheels, and the engine is disconnected from the power distribution device by bringing the clutch into disengagement.

JP-A-2005-184999 describes a power output unit configured to establish a cancel torque for cancelling a reaction torque acting on a ring gear by a second motor/generator when starting an engine by a torque of the first motor/generator. According to the teachings of JP-A-2005-184999, the cancel torque is calculated so that a total of the cancel torque and the reaction torque will act in the required direction.

SUMMARY OF INVENTION

Technical Problem

According to the power output unit taught by JP-A-2005-184999, the engine is always connected to a power distribution device to transmit torque therebetween. That is, torque of the first motor/generator is applied to the engine through the power distribution device on a constant basis so that the reaction torque can be estimated based on a torque command to the first motor/generator and a gear ratio of the power distribution device. The reaction torque thus estimated is used to calculate the cancel torque to be established during motoring of the engine.

According to the teachings of JP-A-2012-224244, on the other hand, a friction clutch is disposed between the engine and the power distribution device. The friction clutch is brought into disengagement when stopping the engine, and brought into engagement to crank the engine by the first motor/generator as taught by JP-A-2005-184999. When cranking the engine by the first motor/generator, specifically, the friction clutch is brought into engagement by a hydraulic actuator while causing a slip so that an engagement shocks caused by inertial energy of the engine can be reduced.

However, commencement of change in torque capacity of the friction clutch is structurally delayed behind reception of a command signal from an electronic control unit. Therefore, if the friction clutch is employed as taught by JP-A-2012-224244, it would not be able to accurately estimate the reaction torque acting on the ring gear during cranking the engine while causing a slip of the friction clutch.

That is, given that the reaction torque is estimated by the method of JP-A-2005-184999 in the vehicle using the friction clutch as described in JP-A-2012-224244, torque capacity of the friction clutch will be changed after reception of the command signal and hence the estimated reaction torque would be differ from an actual reaction torque. In this case, therefore, the actual reaction torque would not be cancelled effectively by the cancel torque thus estimated inaccurately. Consequently, a direction of the drive torque applied to an axle would be reversed thereby causing shocks and gear noises.

Aspects of preferred embodiments have been conceived noting the foregoing technical problems, and it is therefore an object of various preferred embodiments is to provide an engine starting system for suppressing gear rattle and vibrations during cranking of the engine.

Solution to Problem

Preferred embodiments relate to an engine starting system of for a hybrid vehicle. Specifically, the engine starting system is applied to a vehicle comprising: an engine; a first motor and a second motor individually having a generating function; a power distribution device configured to perform a differential action among a first rotary element connected to the first motor, a second rotary element connected to the engine through a friction clutch disposed between the engine and the power distribution device, and a third rotary element functioning as an output member. In the hybrid vehicle, a torque of the second motor is delivered to drive wheels in addition to a torque of the third rotary member. The engine starting system is configured to establish a cancel torque by the second motor to cancel a reaction torque acting on an axle when starting the engine by the first motor, and to increase the torque of the second motor in a direction of a drive torque rotating the axle, when starting the engine while bringing the friction clutch into engagement in a slipping manner.

The engine starting system is further configured to increase the torque of the second motor in a direction of a drive torque rotating the axle in case a required drive torque falls within a predetermined range around zero.

The engine starting system is further configured to add a correction torque of the same direction as the drive torque to the torque of the second motor. In addition, an amount of the correction torque is set in a manner such that the direction of the drive torque will not be reversed when cancelling the reaction torque by the corrected torque of the second motor.

The engine starting system is further configured to estimate a torque capacity of the friction clutch based on a torque command transmitted to the friction clutch, and to calculate the cancel torque based on the torque command to the friction clutch.

Specifically, the torque of the second motor includes the required drive torque and the cancel torque. In addition, the engine starting system is further configured to increase the cancel torque in the direction of the drive torque.

Advantageous Effects of Invention

Thus, according to preferred embodiments, the reaction torque acting on the axle can be cancelled by the torque of the second motor in order not to reverse the drive torque during cranking the engine by the first motor while bringing the friction clutch into engagement. Therefore, even if the drive torque is varied during cranking the engine, gear rattles and vibrations can be reduced.

In addition, if the estimated drive torque is around zero and hence the direction of the drive torque is expected to be reversed by the reaction torque, the second motor generates the torque increased in the direction of the drive torque. Therefore, gear rattles and vibrations can be reduced effectively.

Consequently, the drive torque can be prevented from being reversed during starting the engine.

In addition, even if the estimated torque capacity of the friction clutch is different from an actual torque capacity, the reaction torque acting on the axle during cranking the engine can be cancelled by the torque of the second motor.

Specifically, the reaction torque acting on the axle when starting the engine can be cancelled by increasing the cancel torque established by the second motor in the direction of the drive torque. Therefore, the direction of the drive torque will not be reversed during starting the engine. To this end, the required drive torque can be calculated by a conventional calculation. That is, the calculation for correcting the cancel torque is simply added to the conventional calculations. For this reason, the engine starting system according to preferred embodiments can be flexibly applied to the conventional two-motor split type hybrid vehicle.

BRIEF DESCRIPTION OF DRAWINGS

FIG. 1 is a flowchart showing one example of the engine starting control according to preferred embodiments.

FIG. 2 is a nomographic diagram showing a situation in which a positive torque is required in the hybrid vehicle propelled in the forward direction under EV mode while disengaging the clutch.

FIG. 3 is a nomographic diagram showing a situation of the hybrid vehicle where the engine starting control is executed under the situation shown in FIG. 2.

FIG. 4 is a nomographic diagram showing a situation in which a negative torque is required in the hybrid vehicle propelled in the forward direction under EV mode while disengaging the clutch.

FIG. 5 is a nomographic diagram showing a situation of the hybrid vehicle where the engine starting control is executed under the situation shown in FIG. 4.

FIG. 6 is a time chart showing temporal changes in the status of the hybrid vehicle propelling while applying a positive torque to the axle during execution of the engine starting control.

FIG. 7 is a time chart showing temporal changes in the status of the hybrid vehicle propelling while applying a negative torque to the axle during execution of the engine starting control.

FIG. 8 is a skeleton diagram showing one example of a powertrain of the hybrid vehicle to which the engine starting system of present invention is applied.

FIG. 9 is a nomographic diagram showing a situation of the hybrid vehicle propelled in the backward direction under EV mode while disengaging the clutch.

FIG. 10 is a nomographic diagram showing a situation of the hybrid vehicle during execution of the engine starting control under the situation shown in FIG. 9.

FIG. 11 is a nomographic diagram showing a situation of the hybrid vehicle under HV mode.

FIG. 12 is a nomographic diagram showing of a situation of the hybrid vehicle under dual-motor mode.

FIG. 13 (a) is a nomographic diagram showing a situation of the hybrid vehicle under single-motor mode. FIG. 13 (b) is a nomographic diagram showing a situation of the hybrid vehicle under the first EV mode of the single-motor mode where the clutch is in completer engagement. FIG. 13 (c) is a nomographic diagram showing a situation of the hybrid vehicle under the second EV mode where the clutch is in complete engagement.

FIG. 14 is a skeleton diagram showing another example of a powertrain of the hybrid vehicle to which the engine starting system of present invention is applied.

DESCRIPTION OF EMBODIMENTS

Hereinafter, preferred examples of the engine starting system will be explained with reference to the accompanying drawings. According to the preferred examples to be explained, the engine starting system is applied to a two-motor split type hybrid vehicle having a clutch adapted to selectively disconnect an engine from a power distribution device. Specifically, the engine starting system is configured not to reverse a torque applied to an axle to achieve a required drive torque during cranking the engine by the motor when the clutch is in disengagement.

Referring now to FIG. 8, there is shown a structure of the hybrid vehicle to which the engine starting system is applied. As shown in FIG. 8, the hybrid vehicle Ve is comprised of a two-motor split type powertrain 100. In order to control the powertrain 100, the hybrid vehicle is provided with an electronic control unit (abbreviated as "ECU" hereinafter) 30 serving as a controller of the engine starting system.

A prime mover of the powertrain 100 includes an internal combustion engine (abbreviated as "ENG" in FIG. 8) 1, a first motor/generator 2 (abbreviated as "MG1" in FIG. 8), and a second motor/generator 3 (abbreviated as "MG2" in FIG. 8).

For example, a conventional gasoline engine may be used as the engine 1, and a permanent magnet type synchronous motor may be used as the motor/generators 2 and 3 respectively. Those engine 1 and the motor/generators 2 and 3 are also electrically controlled by the ECU 30. In the following descriptions, the motor/generators 2 and 3 will simply be called as "the motor 2" and "the motor 3" for the sake of convenience.

In the powertrain 100, a power of the engine 1 is delivered to a power distribution device 6 via an input shaft 5, and further distributed to the first motor 2 side and drive wheels 20 side through the power distribution device 6. A torque of the second motor 3 is added to a torque delivered from the power distribution device 6 to the drive wheels 20. That is, the power of the engine 1 is partially converted into an electric power by the first motor 2, and then converted into a mechanical power again by the second motor 3 to be delivered to the drive wheels 20.

In order to disconnect the engine 1 from the power distribution device 6 when stopping the engine 1, a friction clutch C is disposed therebetween. When the engine 1 is restarted, the friction clutch C is brought into engagement to deliver the power of the engine 1 to the power distribution device 6.

Specifically, the friction clutch C is a conventional clutch having a pair of frictional engagement elements. As shown in FIG. 8, one of the engagement elements Ca is coupled to a crankshaft 4 of the engine 1 to be rotated therewith, and other engagement element Cb is coupled to the input shaft 5 to be rotated therewith. In the powertrain 100, therefore, torque transmission between the engine 1 and the power distribution device 6 is cut off by bringing the friction clutch C into complete disengagement. By contrast, torque transmission between the engine 1 and the power distribution device 6 is enabled by bringing the friction clutch into complete engagement.

Given that the friction clutch C is in the complete disengagement, the engagement elements Ca and Cb are isolated from each other. By contrast, given that the friction clutch C is in the complete engagement, the engagement elements Ca and Cb are engaged to each other without causing a slippage. The friction clutch C may also be engaged while causing a slippage between the engagement elements Ca and Cb. In the following descriptions, the friction clutch C will simply be called the "clutch C" for the sake of convenience.

The power distribution device 6 is adapted to perform a differential action among a plurality of rotary elements. To this end, according to the preferred example, a single-pinion planetary gear unit is employed as the power distribution device 6, and the power distribution device 6 is comprised of a sun gear 6s serving as a first rotary element, a carrier 6c serving as a second rotary element, and a ring gear 6r serving as a third rotary element.

The sun gear 6s is an external gear fitted onto the input shaft 5, and the ring gear 6r as an internal gear is arranged concentrically with the sun gear 6s. A plurality of pinion gears are interposed between the sun gear 6s and the ring gear 6r while meshing therewith, and those pinion gears are supported by the carrier 6c while being allowed to rotate and revolve around the sun gear 6s.

Specifically, the sun gear 6s is joined to a rotor shaft 2a of the first motor 2 to be rotated integrally therewith. Therefore, torque of the first motor 2 can be distributed to the input shaft 5 side and to the drive wheels 20 side through the power distribution device 6.

The carrier 6c is connected to the engine 1 through the input shaft 5 and the clutch C to serve as an input element of the power distribution device 6. That is, the carrier 6c is allowed to be rotated integrally with the input shaft 5 and the engagement element Cb irrespective of an engagement state of the clutch C. Specifically, given that the clutch C in disengagement, the carrier 6c is rotated relatively to the crankshaft 4. By contrast, given that the clutch C is in engagement, the carrier 6c is rotated integrally with the crankshaft 4.

According to the preferred example, an input member of the powertrain 100 includes the carrier 6c, the input shaft 5, and the engagement element Cb rotated integrally with the carrier 6c. Given that the clutch C is in engagement, the input member further includes the engagement element Ca and the crankshaft 4.

The ring gear 6r serves as an output element of the power distribution device 6 to deliver the torque to the drive wheels 20. To this end, the ring gear 6r is joined to an output shaft 7 to be rotated integrally therewith, and the output shaft 7 is also joined to an output gear 8 as an external gear to be rotated integrally therewith. That is, the output gear 8 serves as an output member of the powertrain 100 to deliver torque to the drive wheels 20. The ring gear 6r, the output shaft 7 and the output gear 8 may be formed integrally.

The output gear 8 is connected to a differential gear unit 12 through a counter gear unit 11. Specifically, the counter gear unit 11 is comprised of a counter driven gear 11a, a countershaft 11b, and a counter drive gear 11c. The counter driven gear 11a is fitted onto the countershaft 11b while meshing with the output gear 8, and the counter drive gear 11c is also fitted onto the countershaft 11b while meshing with a ring gear 12a of the differential gear unit 12. Here, the counter drive gear 11c is diametrically smaller than the counter driven gear 11a. An axle 13 (indicated as "OUT" in FIG. 8) is individually joined to each side of the differential gear unit 12, and the drive wheel 20 is individually fitted onto each axle 13 to which a drive torque $T_{ds}'$ is applied in accordance with a required drive torque $T_{req}$.

In the powertrain 100, the torque of the second motor 3 is also delivered to the drive wheels 20 through the output gear 8. In order to multiply the torque of the second motor 3, the second motor 3 is connected to the output gear 8 through a reduction gear unit 9. As described, the output gear 8, the output shaft 7, and the ring gear 6r of the power distribution device 6 are rotated integrally so that the torque can be delivered from the second motor 3 to the ring gear 6r through the reduction gear unit 9.

A single-pinion planetary gear unit is also employed as the reduction gear unit 9. That is, the reduction gear unit 9 is comprised of a sun gear 9s, a carrier 9c and a ring gear 9r. Specifically, the sun gear 9s is joined to the second motor 3 to serve as an input element so that the sun gear 9s is rotated integrally with a rotor shaft 3a of the second motor 3. The carrier 9c is fixed to a fixed member 10 such as a housing to serve as a reaction element, and the ring gear 9r is joined to the output shaft 7 to be rotated integrally with the output shaft 7 and the output gear 8. A gear ratio of the reduction gear unit 9 is set in a manner such that the ring gear 9r is allowed to multiply the torque of the second motor 3. Here, the ring gear 9r may also be formed integrally with the output shaft 7 and the output gear 8.

For example, when decelerating the hybrid vehicle Ve, the ECU 30 carries out a regeneration control to convert an external mechanical power from the drive wheels 20 into an electric power by the second motor 3. For this purpose, the hybrid vehicle Ve is provided with a battery 42, and electric powers regenerated by the motors 2 and 3 are delivered to the battery 42.

Specifically, the motors 2 and 3 are electrically connected to the battery 42 though an inverter 41 so that the motors 2 and 3 are electrically controlled by the ECU 30 to serve as a motor or a generator depending on the situation. For example, the each motor 2 and 3 is allowed to serve as a motor by delivering electricity stored in the battery 42 thereto. In addition, since the motors 2 and 3 are connected to each other through the inverter 41, the electricity regenerated by the first motor 3 may be delivered directly to the second motor 3 without passing through the battery 42.

The input shaft 5 is joined to an oil pump 15 of a lubrication device so that the oil pump 15 can be driven by rotating the input shaft 5. Namely, the oil pump 15 is a mechanical pump that is driven by the engine 1. Thus, as can be seen from FIG. 8, the crankshaft 4 of the engine 1, the input shaft 5, the rotor shaft 2a of the first motor 2, the power distribution device 6, the reduction gear unit 9, and the rotor shaft 3a of the second motor 3 are arranged coaxially in the powertrain 100.

For example, the clutch C is actuated by a not shown hydraulic actuator or an electromagnetic actuator in response to a control signal transmitted from the ECU 30. Therefore, a torque capacity $T_{cl-act}$ of the clutch C can be controlled arbitrarily by controlling an actuation of the actuator by the ECU 30.

The torque capacity $T_{cl-act}$ of the clutch C may be varied continuously from the complete disengagement to the complete engagement of the clutch C. Here, it is to be noted that the torque capacity $T_{cl\text{-}act}$ of the clutch C is varied substantially proportional to a hydraulic pressure or a current applied to the clutch C, or to a stroke of the clutch C.

Here, the hybrid vehicle Ve is not provided with a torque sensor(s) for detecting torques of the clutch C and the axle 13. According to the preferred example, therefore, an actual torque capacity $T_{cl\text{-}act}$ of the clutch C and an actual drive torque $T_{ds}'$ applied to the axle 13 in accordance with the required drive torque $T_{req}$ are not detected by the sensors.

The ECU 30 is comprised mainly of a microcomputer having a memory device, an interface and etc. Specifically, the ECU 30 is configured to carry out a calculation based on incident data and preinstalled data, and to transmit a calculation result in the form of command signal.

For example, a vehicle speed, an opening degree of accelerator, a rotational speed, a state of charge (abbreviated as the "SOC" hereinafter) of the battery 42 and so on are sent to the ECU 30. The rotational speed includes an input speed $N_{in}$ of the input member, a speed $N_{mg1}$ of the first motor 2, and a speed $N_e$ of the engine 1 (as will be called the "engine speed $N_e$" hereinafter). Specifically, the input speed $N_{in}$ includes a speed of the carrier 6c of the power distribution device 6, a speed of the input shaft 5, and a speed of the engagement element Cb of the clutch C. Here, given that the clutch C is in complete engagement, the engine speed $N_e$ is equal to the input speed $N_{in}$. As described, since the vehicle Ve is not provided with the torque sensors, the actual drive torque $T_{ds}'$ and the actual torque capacity $T_{cl\text{-}act}$ are not sent to the ECU 30.

For example, a map determining the required drive torque $T_{req}$, a map determining a target speed $N_{ref}$ of the input speed $N_{in}$, a map determining a command value of the torque capacity $T_{cl}'$ of the clutch C (referred to as "clutch torque command $T_{cl}'$" hereinafter), a map determining a command value $T_{mg1}'$ of the torque of the first motor 2, a map determining a command value $T_{mg2}'$ of the torque of the second motor 3 etc. are preinstalled in the ECU 30. In addition, the torque capacity $T_{cl\text{-}act}$ of the clutch C with respect to an actuation of the actuator may also be preinstalled in the ECU 30 in the form of map.

The ECU 30 is configured to transmit command signals for controlling the engine 1, the clutch C, and motors 2 and 3 and so on depending on the running condition of the hybrid vehicle Ve.

Specifically, the clutch torque command $T_{cl}'$ of the clutch C is sent to the actuator, and torque commands $T_{mg1}'$ and $T_{mg2}'$ of the motors 2 and 3 are sent to the inverter 41.

For instance, the required drive torque $T_{req}$ is determined based on an opening degree of the accelerator and a vehicle speed sent to the ECU 30 while with reference to the preinstalled map determining the required drive torque $T_{req}$. The required drive torque $T_{req}$ thus determined is sent to the prime mover in the form of command signal.

In the following description, the aforementioned torque command $T_{mg1}'$ of the torque of the first motor 2 will also be referred to as the "commanded torque $T_{mg1}'$", and the torque command $T_{mg2}'$ of the second motor 3 will also be referred to as the "commanded torque $T_{mg2}'$".

A drive mode of the hybrid vehicle Ve can be selected from a hybrid mode (as will be called the "HV" mode hereinafter) where the hybrid vehicle is powered by the engine 1, and a motor mode (as will be called the "EV" mode hereinafter) where the vehicle is propelled by driving the second motor 3 by the electricity from the battery 42 while stopping the engine 1. Specifically, the drive mode of the hybrid vehicle Ve is selected from the HV mode and the EV mode by the ECU 30 to achieve a required drive torque $T_{req}$, depending on the running condition such as an opening degree of the accelerator, a vehicle speed, the SOC of the battery 42 and so on.

For example, the HV mode may be selected under conditions that an opening degree of the accelerator is relatively large so that the hybrid vehicle Ve is propelled at a relatively high speed. In addition, even if the opening degree of the accelerator is small, the drive mode is shifted to the HV mode when the SOC of the battery 42 falls below a predetermine threshold.

The HV mode includes a drive mode where the hybrid vehicle is powered by both the engine 1 and the second motor 3, and a drive mode where the hybrid vehicle is powered only by engine 1. Under the HV mode, the clutch C is brought into engagement completely so that the engine speed $N_e$ can be controlled by the first motor 2.

Referring now to FIG. 11, there is shown a nomographic diagram indicating statuses of the rotary elements of the power distribution device 6 under the HV mode. As shown in FIG. 11, under the HV mode, the engine 1 generates the engine torque $T_e$ and the second motor 3 generates the commanded torque $T_{mg2}'$ in the forward direction. In this situation, the engine speed $N_e$ (i.e., the input speed $N_{in}$) can be varied by controlling the torque of the first motor 2 depending on the situation.

That is, under the HV mode, the engine 1 is allowed to be operated at an operating point where fuel efficiency is optimized by controlling the engine speed $N_e$ by the first motor 2. Here, it is to be noted that the operating point of the engine 1 is governed by the engine speed $N_e$ and the engine torque $T_e$. To this end, a map determining the operating point based on the vehicle speed and the opening degree of the accelerator is preinstalled in the ECU 30, and the operating point of the engine 1 is determined based on incident data about the vehicle speed and the opening degree of the accelerator with reference to the map. Basically, the operating point of the engine 1 is determined on an optimum fuel curve, and the first motor 2 is controlled in a manner such that the engine 1 is operated at the determined operating point.

Given that a gasoline engine is employed as the engine 1, the ECU 30 controls an opening degree of a throttle valve, a fuel supply, an interruption of fuel supply, an ignition timing etc. In order to reduce fuel consumption, the ECU 30 is configured to stop the engine 1 automatically if the situation allows (as will be called an "engine stopping control" hereinafter).

Specifically, the engine stopping control is carried out under conditions that the hybrid vehicle Ve is in operation so as to stop fuel supply to the engine 1 and ignition of the engine 1.

For example, the engine stopping control is carried out when the hybrid vehicle Ve propelled under the HV mode waits at a traffic light to stop the engine 1 temporarily (i.e., an idle stop control). The engine stopping control includes a fuel cut-off control to be carried out when an accelerator pedal is returned at a vehicle speed higher than a predetermined speed. Under the fuel-cut control, fuel supply to the engine 1 is stopped until the engine speed is lowered to a self-sustaining speed (i.e., to an idling speed).

Specifically, the engine stopping control is carried out on the occasion of shifting the drive mode from the HV mode to the EV mode in order not to consume fuel.

For example, the EV mode can be selected under conditions where an SOC of the battery 42 is sufficient, and an opening degree of the accelerator is relatively small. It is to be noted that the EV mode includes a dual-motor mode where the hybrid vehicle is powered by both motors 2 and 3, and a single-motor mode where the hybrid vehicle is powered only by the second motor 3. A situation of the hybrid vehicle under the dual-motor mode is shown in FIG. 12, and a situation of the hybrid vehicle under the single-motor mode is shown in FIG. 13.

In the situation illustrated in FIG. 12, the positive drive torque $T_{req}$ is required to accelerate the vehicle Ve under the dual-motor mode. In this situation, the clutch C is in complete engagement, and the engine 1 is stopped. Under the dual-motor mode, specifically, the first motor 2 is rotated in the counter direction to establish the commanded torque $T_{mg1}'$, and the second motor 3 is rotated in the forward direction to establish the commanded torque $T_{mg2}'$.

Consequently, the drive torque $T_d'$ of the second motor 3 is applied to the axle 13 (indicated as OUT in FIG. 12) to rotate the axle 13 in the forward direction. In this situation, a rotational speed of the second motor 3 is increased in the forward direction to accelerate the vehicle by increasing the rotational speed of the first motor 2 in the counter direction.

FIG. 13(a) shows a situation of the hybrid vehicle Ve under the single-motor mode. Under the single-motor mode, the first motor 2 is stopped and the second motor 3 generates the MG2 torque command $T_{mg2}'$ in the positive direction to achieve the required drive torque $T_{req}$. In this situation, since the first motor 2 is stopped, the first motor 2 generates neither the speed $N_{mg1}$ nor MG1 torque command $T_{mg1}'$.

The single-motor mode may be categorized into a first EV mode where the clutch C is in complete engagement and a second EV mode where the clutch C is in complete disengagement. Under the first EV mode, specifically, the engine 1 is connected to the power distribution device 6. By contrast, under the second EV mode, the engine 1 is disconnected from the power distribution device 6. Situations of the hybrid vehicle Ve under the first EV mode and under the second EV mode are shown in FIG. 13(b) and FIG. 13(c) respectively.

As shown in FIG. 13 (b), since the clutch C is in complete engagement under the first EV mode, the engine speed $N_e$ is equal to the input speed $N_{in}$. In this situation, since the first motor 2 is stopped but the input member is rotated, the stopping engine 1 is rotated passively.

For example, if the engine is expected to be restarted during the EV mode, the first EV mode is selected. Under the first EV mode, however, a power loss would be caused by rotating the engine 1 passively. In order to avoid such power loss, the drive mode can be shifted to the second EV mode by bringing the clutch C into disengagement if the situation allows. For example, the second EV mode can be selected if an SOC of the battery 42 is sufficient and the required drive torque $T_{req}$ can be achieved only by the motors 2 and 3. Under the second EV mode, therefore, the engine is disconnected from the power distribution device 6 while being stopped.

As shown in FIG. 13 (c), since the clutch C is in complete disengagement, the engine speed $N_e$ is different from the input speed $N_{in}$ under the second EV mode. Specifically, the engine speed $N_e$ is reduced to zero, and the input speed is higher than the engine speed $N_e$ in the forward direction.

When a predetermined condition to restart the engine 1 is satisfied during the second EV mode, the drive mode is shifted from the second EV mode to the HV mode by restarting the engine 1 while bringing the clutch C in a slipping manner.

For example, the starting condition of the engine 1 is satisfied in case the accelerator pedal is depressed to require the larger driving force, and in case the SOC of the battery 42 is insufficient to achieve the required drive torque $T_{req}$.

Optionally, the ECU 30 is allowed to select the drive mode based on information from a Global Positioning System about road conditions such as a road gradient. In this case, given that the hybrid vehicle Ve is propelled under the EV mode, the engine 1 may be started in advance depending on the expected road condition. To this end, the engine speed $N_e$ is kept to the idling speed during the EV mode.

When shifting the drive mode, the ECU 30 controls the torque capacity $T_{cl\text{-}act}$ of the clutch C with reference to a map stored in the memory device. The clutch torque command thus determined is transmitted to the actuator so that the actuator is actuated in response to the clutch torque command $T_{cl}'$.

As described, a friction clutch is used as the clutch C and the torque capacity thereof can be varied gradually. In this situation, however, a response delay of the clutch C arises from the structure thereof.

For example, given that a hydraulic frictional clutch is used as the clutch C, an actuation of the actuator would be delayed behind the transmission of the clutch torque command $T_{cl}'$. That is, change in the torque capacity $T_{cl\text{-}act}$ of the clutch C is delayed behind the transmission of the clutch torque command $T_{cl}'$. Consequently, the actual torque capacity $T_{cl\text{-}act}$ may temporarily differ from the clutch torque command $T_{cl}'$. In addition, the hybrid vehicle Ve does not have a torque sensor to detect the actual torque capacity $T_{cl\text{-}act}$. However, when shifting the drive mode for example, the ECU 30 has to control the output torque of each motor 2 and 3 in response to a change in the actual torque capacity $T_{cl\text{-}act}$.

For this reason, the ECU 30 carries out calculations based on the assumption that the actual torque capacity $T_{cl\text{-}act}$ of the clutch C is identical to the clutch torque command $T_{cl}'$. Specifically, in order to control the torque of each motor 2 and 3, the ECU 30 treats the clutch torque command $T_{cl}'$ as an estimation value of the torque capacity $T_{cl\text{-}act}$ of the clutch C.

The ECU 30 is configured to control a direction and a magnitude of the motor torque depending on the running condition of the hybrid vehicle Ve. Specifically, a rotational direction of the rotor shaft of the motor 2 or 3 is altered between the forward and the counter directions by the motor torque control. For example, the motor is allowed to serve as a motor by increasing a rotational speed of the rotor shaft. By contrast, the motor is allowed to serve as a motor by decreasing a rotational speed of the rotor shaft.

In the following descriptions, the rotational directions of the motor 2 or 3 will be called as the "forward direction" and the "counter direction". Specifically, definition of the "forward direction" is a rotational direction of the engine 1, and definition of the counter direction is a rotational direction opposite to the rotational direction of the engine 1. Additionally, in the following descriptions, a torque in the forward direction will be called as the "positive torque", and a torque in the counter direction will be called as the "negative torque".

According to the preferred example, the ECU 30 determines the torque command $T_{mg1}'$ to the first motor 2 based on the input speed $N_{in}$ and the clutch torque command $T_{cl}'$. Optionally, a map determining the torque command $T_{mg1}'$ may be preinstalled in the ECU 30.

Likewise, the ECU 30 determines the torque command $T_{mg2}'$ to the second motor 3 based on the required drive torque $T_{req}$ and the clutch torque command $T_{cl}'$. Thus, the torque commands $T_{mg1}'$ and $T_{mg2}'$ are calculated using the clutch torque command $T_{cl}'$ even if it is different from the actual clutch torque capacity $T_{cl\text{-}act}$ due to the response delay.

The input speed $N_{in}$ is changed to a target speed by controlling the torque command $T_{mg1}'$ to the first motor 2 to change the speed $N_{mg1}$ thereof. Alternatively, the input speed $N_{in}$ is maintained at a predetermined speed by controlling the first motor 2. As described, the clutch C is in complete engagement under the HV mode so that the engine speed $N_e$ as the input speed $N_{in}$ can be controlled by controlling the torque command $T_{mg1}'$ to the first motor 2.

In order to transmit power of the first motor 2 to the engine 1 without power loss caused by the clutch C, the torque command $T_{mg1}'$ to the first motor 2 is adjusted to be comparable to the clutch torque command $T_{cl}'$ to the clutch C. To this end, specifically, the torque command $T_{mg1}'$ of the first motor 2 is calculated based on the clutch torque command $T_{cl}'$ and a gear ratio $\rho$ of the power distribution device 6. Given that the torque command $T_{mg1}'$ and the clutch torque command $T_{cl}'$ are balanced to each other or a difference therebetween falls within a tolerance range, the torque of the first motor 2 acting on the engagement element Cb of the clutch C is adjusted to the torque capacity $T_{cl\text{-}act}$ of the clutch C.

The torque command $T_{mg2}'$ to the second motor 3 will be explained in more detail with reference to FIGS. 2, 3, 4 and 5. FIG. 2 is a nomographic diagram showing a situation in which the vehicle Ve is propelled under the second EV while being accelerated, and FIG. 3 is a nomographic diagram showing a situation in which the engine starting control is executed under the situation shown in FIG. 2. In turn, FIG. 4 is a nomographic diagram showing a situation in which the vehicle Ve is propelled under the second EV while being decelerated, and FIG. 5 is a nomographic diagram showing a situation in which the engine starting control is executed under the mode shown in FIG. 4.

As shown in FIGS. 2 and 4, under the second EV mode, the required drive torque $T_{req}$ is achieved by the torque $T_{mg2}$ of the second motor delivered to the axle 13 (represented as "OUT"). That is, the second motor 3 generates a torque in a direction to achieve the required torque $T_{req}$. In this situation, the first motor 2 is stopped.

As shown in FIGS. 3 and 5, when starting the engine 1 under the second EV mode, the engine speed $N_e$ is raised by the first motor 2 while slipping the clutch C. In this situation, however, a reaction torque $T_r$ will be applied to the axle 13 in the direction to rotate the axle 13 in the counter direction.

Consequently, the drive torque $T_{ds}'$ is varied by the reaction torque $T_r$ acting on the axle 13. For this reason, when starting the engine 1 by the first motor 2, the second motor 3 is required to establish a cancel torque $T_{cs}$ to counteract to the reaction torque $T_r$ acting on the axle 13. In this case, therefore, the torque command $T_{mg2}'$ to the second motor 3 is set to achieve a total torque of the required drive torque $T_{req}$ and the cancel torque $T_{cs}$.

Although the cancel torque $T_{cs}$ is not indicated in FIGS. 3 and 5, a direction of the cancel torque $T_{cs}$ is identical to that of an after-mentioned corrected cancel torque $T_{cs}'$ that is indicated in those figures.

In order to counteract to the reaction torque $T_r$, the cancel torque $T_{cs}$ is established in the opposite direction to the reaction torque $T_r$. In the situations shown in FIGS. 3 and 5, the reaction torque $T_r$ acts on the axle 13 in the counter direction and hence the cancel torque $T_{cs}$ is established to act in the forward direction.

As shown in FIGS. 3 and 5 the reaction torque $T_r$ is composed of a reaction torque $T_{r1}$ generated based on the torque command $T_{mg1}'$ transmitted to the first motor 2 when motoring the engine 1, and a reaction torque $T_{r2}$ arising from an inertial torque $T_i$ of the engine 1 acting on the engagement element Cb of the clutch C as a result of increasing the clutch torque capacity $T_{cl\text{-}act}$. However, if the engine 1 is started under the first EV mode, the clutch C is in complete engagement and hence the reaction torque $T_{r2}$ will not be generated by the clutch C. In this case, therefore, the reaction torque $T_r$ is composed only of the reaction torque $T_{r1}$ established by the first motor 2.

According to the preferred example, specially, the second motor 3 establishes the corrected commanded torque $T_{mg2}'$ to start the engine 1 under the second EV mode.

Next, here will be explained the engine starting control according to the preferred example with reference to the flowchart shown FIG. 1. At step S1, it is determined whether or not the engine starting control is to be commenced under the condition that the clutch C is in complete disengagement, that is, whether or not to shift the drive mode from the second EV mode to the HV mode.

More specifically, at step S1, it is determined whether or not the engine starting condition is satisfied to carry out the motoring of the engine 1 while causing slippage of the clutch C.

If the answer of step S1 is NO, the routine is ended. By contrast, if the answer of the step S1 is YES, the cancel torque $T_{cs}$ is determined based on the clutch torque command $T_{cl}'$ (at step S2).

At step S2, specifically, the cancel torque $T_{cs}$ is calculated based on the torque command $T_{mg}'$ to the first motor 2, the torque command $T_{cl}'$ to the clutch C, and the gear ratio $\rho$ of the power distribution device 6. The cancel torque $T_{cs}$ thus calculated will counteract to the reaction torque $T_r$ composed of the reaction torque $T_{r1}$ resulting from motoring the engine 1 by the first motor 2 and the reaction torque $T_{r2}$ of the clutch C.

As described, according to the preferred example, calculations are carried out based on the assumption that the clutch torque command $T_{cl}'$ is identical to the actual torque capacity $T_{cl\text{-}act}$ of the clutch C. At step S2, therefore, the clutch torque command $T_{cl}'$ is used as an estimated torque capacity $T_{cl\text{-}act}$ of the clutch C to calculate the cancel torque $T_{cs}$.

Then, it is determined whether or not the required drive torque $T_{req}$ falls within a predetermined range across zero (at step S3). That is, it is determined whether or not the required drive torque $T_{req}$ is greater than a predetermined lower limit and less than a predetermined upper limit at step S3.

If the required drive torque $T_{req}$ does not fall within the predetermined range so that the answer of step S3 is NO, the routine is ended.

At step S3, such determination is also made based on the assumption that the required drive torque $T_{req}$ is identical to the actual drive torque $T_{ds}'$. That is, at step S3, it is determined whether or not the actual drive torque $T_{ds}'$ falls within the predetermined range by determining whether or not the required drive torque $T_{req}$ falls within the predetermined range. The required drive torque $T_{req}$ will also be used as the estimated value of the actual drive torque at the below-mentioned step S4.

Given that the actual drive torque $T_{ds}'$ falls within the range around zero and that the cancel torque is excessively large, a direction of the drive torque $T_{ds}'$ would be reversed by the reaction torque $T_r$ and the cancel torque. Therefore, if such reversal of torque is expected to occur, the cancel torque T determined at the step S2 will be corrected by increasing the torque command $T_{mg2}$ to the first motor 2 in a direction to achieve the required drive torque $T_{req}$.

Specifically, if the required drive torque $T_{req}$ falls within in the predetermined range so that the answer of step S3 is YES, then it is determined whether or not the required drive torque $T_{req}$ is a positive torque (at step S4).

To this end, the direction of the required drive torque $T_{req}$ is determined at step S4 to estimate the direction of the actual drive torque $T_{ds}'$. If the required drive torque $T_{req}$ is a negative torque, the answer of step S4 will be NO.

If the required drive torque $T_{req}$ is positive so that the answer of step S4 is YES, the torque command $T_{mg2}$ to the second motor 3 is increased in the positive direction (at step S5).

At step S5, for example, the torque command $T_{mg2}'$ to the second motor 3 is increased by increasing the cancel torque T calculated at step S3 in the positive direction. The cancel torque T thus increased will be called the corrected cancel torque That That is, the torque command $T_{mg2}'$ to the second motor 3 thus corrected is a sum of the corrected cancel torque $T_{cs}'$ and the required torque $T_{req}$.

By contrast, if the required drive torque $T_{req}$ is negative so that the answer of step S4 is NO, the torque command $T_{mg2}$ to the second motor 3 is increased in the negative direction (at step S6).

At step S6, for example, the torque command $T_{mg2}'$ to the second motor 3 is increased by increasing the cancel torque $T_{cs}$ calculated at step S3 in the negative direction. In this case, the torque command $T_{mg2}'$ to the second motor 3 thus corrected is a sum of the cancel torque $T_{cs}'$ corrected in the negative direction and the required torque $T_{req}$.

Then, the second motor 3 generates the torque based on the corrected torque command $T_{mg2}'$ at step S7. In this situation, specifically, the corrected torque command $T_{mg2}'$ composed of the required drive torque $T_{req}$ and the corrected cancel torque $T_{cs}'$ is generated by the second motor 3 so that the reaction torque $T_r$ acting on the axle 13 can be cancelled by the torque of the second motor 3 and that the drive torque $T_{ds}$ can be prevented from being reversed.

The expressions "the negative direction" and "the negative direction" merely indicate directions to increase the torque command $T_{mg2}$ but not indicate the final direction of the corrected torque command $T_{mg2}'$.

According to preferred embodiments, the order of the steps for the engine starting control is not limited to the order shown in FIG. 1. For example, the step of calculating the cancel torque T may be carried out after a satisfaction of affirmative determination at step S3. That is, the cancel torque $T_{cs}$ may be calculated any time before step S4.

In addition, at step S4, the direction of the required torque $T_{req}$ may be determined based on a position of shift lever, an opening degree of accelerator, a direction of commanded torque $T_{mg2}'$ and so on. For example, if the shift lever is situated at the drive position and the acceleration pedal is depressed, or if the torque command $T_{mg2}'$ is positive under the second EV mode, it may be determined affirmatively at step S4.

As described, the reaction torque $T_{r1}$ of the MG1 and the reaction torque $T_{r2}$ of the clutch C are cancelled by the cancel torque $T_{cs}$. To this end, the corrected cancel torque $T_{cs}'$ is calculated at step S5 or S6 by adding a correction torque $\Delta T$ to the cancel torque $T_{cs}$.

Specifically, an absolute value (i.e., a correction amount) of the correction torque $\Delta T$ is set within an extent that the corrected cancel torque $T_{cs}'$ is increased but not to reverse the direction of the drive torque $T_{ds}'$. Consequently, the torque command $T_{mg2}'$ to the second motor 3 is corrected at step S7 in the amount of the correction torque $\Delta T$.

Referring back to FIG. 3, the correction of the torque command $T_{mg2}$ of the first motor 2 in the forward direction at step S5 will be explained in more detail. Given that the reaction torque $T_r$ acts on the axle 13 in the counter direction, the corrected cancel torque $T_{cs}'$ is set in a manner to assist a rotation of the axle 13 in the forward direction. In this situation, the positive drive torque $T_{req}$ is required and hence the cancel torque $T_{cs}$ and the correction torque $\Delta T$ are respectively set to assist the drive torque in the forward direction at steps S2 and S5. That is, an absolute value of the corrected cancel torque $T_{cs}'$ is larger than that of the cancel torque $T_{cs}$. Consequently, an absolute value of the correction torque $\Delta T$ is set in a manner such that the direction of the drive torque $T_{ds}'$ will not be reversed from the forward direction but not to be increased excessively. For this reason, gear rattles and vibrations can be reduced, and the drive torque $T_{ds}'$ acting on the axle 13 can be prevented from being increased excessively in the forward direction.

Referring back to FIG. 5, the correction of the torque command $T_{mg2}$ of the first motor 2 in the counter direction at step S6 will be explained in more detail. Given that the reaction torque $T_r$ acts on the axle 13 in the counter direction, the corrected cancel torque $T_{cs}'$ is also set in a manner to assist a rotation of the axle 13 in the forward direction. In this situation, by contrast, the negative drive torque $T_{req}$ is required and the cancel torque $T_{cs}$ has been set to assist the drive torque in the forward direction at steps S2, but the correction torque $\Delta T$ is set to be negative. In this case, therefore, an absolute value of the corrected cancel torque $T_{cs}'$ is smaller than that of the cancel torque $T_{cs}$. Consequently, an absolute value of the correction torque $\Delta T$ is set in a manner such that the direction of the drive torque $T_{ds}'$ will not be reversed from the counter direction but not to be increased excessively. For this reason, gear rattles and vibrations can be reduced, and the drive torque $T_{ds}'$ acting on the axle 13 can be prevented from being increased excessively in the counter direction.

Here will be explained temporal changes in parameters of the hybrid vehicle Ve during execution of the engine starting control shown in FIG. 1 with reference to a time chart shown in FIGS. 6 and 7. Specifically, FIG. 6 shows a situation in which the required drive torque $T_{req}$ is positive so that the correction of step S5 is carried out. By contrast, FIG. 7 shows a situation in which the required drive torque $T_{req}$ is negative so that the correction of step S6 is carried out.

In the example shown in FIG. 6, the vehicle Ve is propelled in the forward direction at low speed in the second EV mode before commencing the engine starting control at point t1. Specifically, before point t1, the torque command $T_{mg1}'$ to the first motor 2, the torque command $T_{cl}'$ to the clutch C, the actual clutch torque capacity $T_{cl\text{-}act}$ of the clutch C and the engine speed $N_e$ are zero, the input speed $N_{in}$ is larger than zero, and the torque command $T_{mg2}'$ to the second motor 3, and a value of the drive torque $T_{ds}'$ acting on the axle 13 (represented as D/S torque in FIG. 6) is positive and slightly larger than zero.

The condition to start engine 1 is satisfied at the point t1 so that the engine starting control is commenced. At point t1, specifically, the ECU 30 transmits the torque command $T_{mg1}'$ to increase the torque $T_{mg1}$ of the first motor 2 in the forward direction, the clutch torque command $T_{cl}'$ to achieve a target torque capacity to cause a slip of the clutch C, and the torque command $T_{mg2}'$ determined at step S7.

Consequently, an engagement of the clutch C is started in a slipping manner so that the actual clutch torque capacity $T_{cl\text{-}act}$ is increased toward the clutch torque command $Y_{cl}'$ after point t1. In this situation, as shown in FIG. 6, an increment of the actual clutch torque capacity $T_{cl\text{-}act}$ is delayed behind a transmission of the clutch torque command $T_{cl}'$, and the actual clutch torque capacity $T_{cl\text{-}act}$ reaches the clutch torque command $T_{cl}'$ at point t2.

In consequence of engagement of the clutch C, the input speed $N_{in}$ starts lowering and the engine speed $N_e$ starts increasing from point t1. In this situation, specifically, the torque of the first motor 2 based on the torque command $T_{mg1}'$ is transmitted through the clutch C from the engagement element Cb to the engagement element Ca so that the crank shaft 4 of the engine 1 is rotated. At the same time, the input speed $N_{in}$ of the input shaft 5 starts to be lowered by the inertial torque $T_i$ shown in FIG. 3 of the stopping engine 1. Thus, the difference between the input speed $N_{in}$ and the engine $N_e$ is reduced by bringing the clutch C into engagement.

The torque command $T_{mg2}'$ transmitted to the second motor 3 at point t1 contains the corrected cancel torque $T_{cs}'$. Therefore, the torque generated by the second motor 3 based on the torque command $T_{mg2}'$ indicated by a solid line in FIG. 6 is larger in the positive direction than an uncorrected torque $T_{mg2\text{-}not}$ of the second motor 3 indicated by a dashed-dotted line in the amount of the correction torque $\Delta T$. In addition, the torque command $T_{mg2}'$ further contains the required drive torque $T_{req}$ so that the drive torque $T_{ds}'$ is varied in accordance with the torque command $T_{mg2}'$. Therefore, the drive torque $T_{ds}'$ indicated by a solid line in FIG. 6 is also increased to be larger in the positive direction than the drive torque $T_{ds\text{-}not}$ indicated by a dashed-dotted line that would have been achieved by the torque command $T_{mg2\text{-}not}$.

After point t1, the torque command $T_{mg1}'$ is controlled in a manner such that the input speed $N_{in}$ toward the target speed $N_{ref}$. Then, when the input speed $N_{in}$ reaches the target speed $N_{ref}$ to bring the clutch C into complete engagement, the torque command $T_{mg1}'$ is increased at point t3 to a value comparable to the clutch torque command $T_{cl}'$ so as to maintain the input speed $N_{in}$ to the target speed $N_{ref}$.

When the engine speed $N_e$ almost reaches the target speed $N_{ref}$, the clutch torque command $T_{cl}'$ is lowered from point t4. In this situation, specifically, the torque capacity of the clutch C is reduced based on another target clutch torque capacity indicated by the dashed-dotted line.

The torque command $T_{mg1}'$ that has been increased to a value comparable to the clutch torque command $T_{cl}'$ after point t3 is then lowered from point t4 to a value comparable to said another target clutch torque capacity. Here, it is to be noted that an electrical response of the first motor 2 is quicker than the hydraulic response of the clutch C. Therefore, an actual torque of the first motor 2 changes to the value required by the torque command $T_{mg1}'$ immediately when the current value to the inverter 41 is changed in response to the torque command $T_{mg1}'$.

Meanwhile, the actual clutch torque capacity $T_{cl\text{-}act}$ is reduced slightly after transmitting another target clutch torque capacity at point t4, and then reaches to another target clutch torque at point t5. Thus, during a period from t4 to t5, an estimated torque capacity of the clutch C based on the clutch torque command $T_{cl}'$ is smaller than the actual clutch torque capacity $T_{cl\text{-}act}$. That is, the command values of the first motor 2 and the clutch C are balanced to each other, but the actual values thereof is not balanced to each other.

As described, according to the preferred example, the actual motor torque of each motor 2 and 3, the actual clutch torque capacity $T_{cl\text{-}act}$ of the clutch C, and the actual drive torque $T_{ds}'$ are estimated based on each command value thereof. Therefore, the cancel torque $T_{cs}$ is calculated using the clutch torque command $T_{cl}'$ as the estimated torque capacity of the clutch C. That is, after point t4, the cancel torque $T_{cs}$ is calculated based on the estimated torque capacity of the clutch C that is smaller than the actual clutch torque capacity $T_{cl\text{-}act}$. In other words, the actual torque capacity $T_{cl\text{-}act}$ of the clutch C is larger than the estimated value thereof and hence the actual reaction torque $T_r$ acting on the axle 13 is larger than the estimated value thereof. As also described, the direction of the required drive torque $T_{req}$ and the direction of the reaction torque $T_r$ are opposite to each other as indicated in FIG. 3 showing the situation from point t1 to point t6.

That is, after point t4, the reaction torque $T_r$ acting on the axle 13 cannot be cancelled only by the cancel torque $T_{cs}$ calculated at step S2 thereby reversing the actual torque acting on the axle 13 from the positive direction. In FIG. 6, the uncorrected torque command $T_{mg2\text{-}not}$ as a sum of the cancel torque $T_{cs}$ calculated at step S2 and the required drive torque $T_{req}$ is indicated by a dashed-dotted line, and the drive torque $T_{ds\text{-}not}$ acting on the axle 13 based on the uncorrected torque command $T_{mg2\text{-}not}$ is also indicated by a dashed-dotted line. Thus, the torque command $T_{mg2\text{-}not}$ and the drive torque $T_{ds\text{-}not}$ shown in FIG. 6 represents a situation in which the correction at step 5 is not applied and hence the direction of the drive torque $T_{ds\text{-}not}$ acting on the axle 13 is reversed from the forward direction.

At point t4, specifically, the second motor 3 generates a torque based on the corrected torque command $T_{mg2}'$ comprised of the corrected cancel torque $T_{cs}'$ calculated at step S5. As can be seen from FIG. 6, the corrected torque command $T_{mg2}'$ is larger than the uncorrected torque command $T_{mg2\text{-}not}$ in the direction of the drive torque $T_{ds}'$ (i.e., positive direction) and in the amount of the correction torque $\Delta T$.

For this reason, the direction of the drive torque $T_{ds}'$ acting on the axle 13 based on the torque command $T_{mg2}'$ will not be reversed from the positive direction to the negative direction across zero. Specifically, the drive torque $T_{ds}'$ is also larger than the uncorrected drive torque $T_{ds\text{-}not}$ in the positive direction and in the amount of the correction torque $\Delta T$. Here, the drive torque $T_{ds}'$ is not necessarily to be increased in a manner such that the direction thereof is not reversed but may be increased in a manner such that the rotational speed of the axle 13 reduced to zero at most.

When the engine speed $N_e$ reaches the target speed $N_{ref}$ at point t6, the ECU 30 determines a fact that the clutch C is brought into complete engagement. Consequently, the drive mode of the hybrid vehicle Ve is shifted to the HV mode. That is, the hybrid vehicle Ve has been propelled in the second EV mode before point t1, and then the drive mode is shifted to the HV mode from point t1 to t6. In addition, the cancel torque $T_{cs}$ is continuously corrected during the period from point t1 to t6, and therefore only the corrected torque command $T_{mg2}'$ is sent to the inverter 41.

Referring now to FIG. 7, there is shown temporal changes in parameters of the hybrid vehicle Ve during execution of the engine starting control shown in FIG. 1 under the situation in which the required drive torque $T_{req}$ is negative. That is, in the situation shown in FIG. 7, the direction of the estimated drive torque is opposite to that of the reaction torque $T_r$. Before point t1, the hybrid vehicle Ve is propelled in the second EV mode. In this situation, specifically, the torque command $T_{mg2}'$ to the second motor 3, and a value of the drive torque $T_{ds}'$ are negative and slightly larger than zero. That is, at point t1, the actual drive torque $T_{ds}'$ falls within the predetermined range of the step 2. In the following description, detailed explanations for the events similar to those in FIG. 6 will be omitted.

In the situation shown in FIG. 7, negative drive torque $T_{req}$ is required and the reaction torque $T_r$ also acts on the axle 13 in the negative direction, that is, acts in the same direction as the required drive torque $T_{req}$. In this situation, therefore, the drive torque $T_{ds}'$ acting on the axle 13 is increased by the reaction torque $T_r$ to be greater than the required drive torque $T_{req}$ in the negative direction. In this case, the second motor 3 is required to generate the torque $T_{mg2}$ in the forward direction so as to cancel the reaction torque $T_r$. Here, the situation before point t1 in FIG. 7 is also shown in a nomographic diagram in FIG. 4.

During a period from t1 to t2, an increment of the actual clutch torque capacity $T_{cl-act}$ is delayed behind a transmission of the clutch torque command $T_{cl}'$, and hence an estimated clutch torque capacity is larger than the actual clutch torque capacity $T_{cl-act}$. Accordingly, the cancel torque $T_{cs}$ is calculated using the estimation value larger than the actual value. In this situation, since the actual clutch torque capacity $T_{cl-act}$ is smaller than the estimated torque capacity, the actual reaction torque $T_r$ acting on the axle 13 is also smaller than an estimated reaction torque. As described, in the situation shown in FIG. 7, the direction of the required drive torque $T_{req}$ is same as that of the reaction torque $T_r$. The situation between point t1 to t6 in FIG. 7 is also shown in a nomographic diagram in FIG. 5.

Thus, after point t1, the cancel torque calculated at step S3 is excessively large in the positive direction to cancel the reaction torque $T_r$ acting on the axle 13. In FIG. 7, the uncorrected torque command $T_{mg2-not}$ as a sum of the cancel torque T calculated at step S2 and the required drive torque $T_{req}$ is indicated by a dashed-dotted line. In this case, although negative drive torque is required, the torque command $T_{mg2-not}$ of the second motor 3 is calculated taking account of the cancel torque T so that the actual drive torque acts on the axle 13 in the positive direction. In FIG. 7, the drive torque $T_{ds-not}$ acting on the axle 13 based on the uncorrected torque command $T_{mg2-not}$ is also indicated by a dashed-dotted line. Thus, the torque command $T_{mg2-not}$ and the drive torque $T_{ds-not}$ shown in FIG. 7 represents a situation in which the correction at step 6 is not applied and hence the direction of the drive torque $T_{ds-not}$ acting on the axle 13 is reversed from the forward direction.

After point t1, the second motor 3 generates a positive torque based on the corrected torque command $T_{mg2}'$ containing the corrected cancel torque $T_{cs}$ calculated at step S6. In this situation, both required drive torque $T_{req}$ and the correction torque $\Delta T$ are negative. However, since the torque command $T_{mg2}'$ contains the cancel torque $T_{cs}$ calculated at step S2, the output torque of the second motor 3 is kept within the forward direction.

That is, in order to start the engine 1, the direction of the torque of the second motor 3 is reversed from the backward direction to the forward direction. Accordingly, as can be seen from FIG. 7, the corrected torque command $T_{mg2}'$ is reduced in the amount of the correction torque $\Delta T$ toward zero in comparison with the uncorrected torque command $T_{mg2-not}$.

For this reason, the direction of the drive torque $T_{ds}'$ acting on the axle 13 based on the torque command $T_{mg2}'$ will not be reversed from the negative direction to the positive direction across zero. As shown in FIG. 7, the drive torque $T_{ds}'$ is larger than the uncorrected drive torque $T_{ds-not}$ in the negative direction and in the amount of the correction torque $\Delta T$.

According to preferred embodiments, the corrected torque command $T_{mg2}$ and the uncorrected torque command $T_{mg2-not}$ may be selected depending on the situation during execution of the engine starting control. For instance, the corrected torque command $T_{mg2}'$ may be selected during the transitional state in which the actual clutch torque capacity $T_{cl-act}$ is changed after the change in the clutch torque command $T_{cl}'$ (i.e., during the period from t1 to t2 in FIGS. 6 and 7). By contrast, in case that the clutch torque command $T_{cl}$ has been maintained to a certain value for a predetermined time period, the uncorrected torque command $T_{mg2-not}$ may be selected. That is, the corrected torque command $T_{mg2}'$ may be selected depending on an occurrence of a response delay of the clutch C. Specifically, in the examples shown in FIGS. 6 and 7, the corrected torque command $T_{mg2}'$ is selected during the period from t1 to t2 and the period from t4 to t5, and the uncorrected torque command $T_{mg2-not}$ is selected during the period from t2 to t4.

Thus, according to the preferred example, the reaction torque acting on the axle when starting engine can be cancelled by the output torque of the second motor even if the actual clutch torque cannot be estimated accurately. Therefore, the drive torque can be prevented from being reversed when starting engine so that gear rattles and vibrations can be reduced.

The starting control system of the present invention should not be limited to the foregoing preferred examples, and various alterations and modifications may be made within the spirit of the present invention.

For example, the foregoing engine starting control may also be carried out when starting the engine in the hybrid vehicle propelled in the backward direction. As indicated in a nomographic diagram shown in FIG. 9, when the hybrid vehicle Ve is propelled backwardly under the second EV mode, the first motor 2 generates the positive torque $T_{mg1}'$ to control the input speed $N_{in}$. In this situation, however, the clutch C is in complete disengagement and hence the reaction torque $T_{r1}$ of the clutch C is not generated. Therefore, as indicated in a nomographic diagram shown in FIG. 10, the reaction torque $T_r$ can be cancelled by the corrected commanded torque $T_{mg2}'$ of the second motor 3 containing the cancel torque $T_{cs}'$.

The engine starting system may also be applied to another powertrain 200 shown in FIG. 14. In the powertrain 200, a location of the second motor 3 is different from that in the power train 100 shown in FIG. 8. In FIG. 14, common reference numerals are allotted to the elements in common with those in the example shown in FIG. 8, and detailed explanation for those common elements will be omitted.

In the powertrain 200 shown in FIG. 14, specifically, a rotor shaft 3a of the second motor 3 extends parallel to those of the engine 1 and the first motor 2 and rotated integrally with a reduction gear 17. The reduction gear 17 is meshed with the counter driven gear 11a of the counter gear unit 11. That is, in the power train 200, the counter driven gear 11a is meshed with both the output gear 8 and the reduction gear 17. In addition, a diameter of the reduction gear 17 is smaller than that of the counter driven gear 11a.

The invention claimed is:

1. An engine starting system for a hybrid vehicle, the engine starting system comprising:
   an engine;
   a first motor and a second motor individually having a generating function;
   a power distribution device configured to perform a differential action among a first rotary element connected to the first motor, a second rotary element connected to the engine through a friction clutch disposed between the engine and the power distribution device, and a third rotary element functioning as an output member;

wherein a torque of the second motor is delivered to drive wheels in addition to a torque of the third rotary member;

wherein the engine starting system is configured to establish a cancel torque by the second motor to cancel a reaction torque acting on an axle when starting the engine by the first motor; and wherein the engine starting system is configured to increase the torque of the second motor in a direction of a drive torque rotating the axle, when starting the engine while bringing the friction clutch into engagement in a slipping manner.

2. The engine starting system as claimed in claim 1, wherein the engine starting system is further configured to increase the torque of the second motor in a direction of a drive torque rotating the axle in case a required drive torque falls within a predetermined range around zero.

3. The engine starting system as claimed in claim 1, wherein the engine starting system is further configured to add a correction torque of the same direction as the drive torque to the torque of the second motor; and wherein an amount of the correction torque is set in a manner such that the direction of the drive torque will not be reversed when cancelling the reaction torque by the corrected torque of the second motor.

4. The engine starting system as claimed in claim 1, wherein the engine starting system is further configured to:
estimate a torque capacity of the friction clutch based on a torque command transmitted to the friction clutch; and
calculate the cancel torque based on the torque command to the friction clutch.

5. The engine starting system as claimed in claim 1, wherein the torque of the second motor includes the required drive torque and the cancel torque; and
wherein the engine starting system is further configured to increase the cancel torque in the direction of the drive torque.

* * * * *